US009756559B2

(12) United States Patent
Qi et al.

(10) Patent No.: US 9,756,559 B2
(45) Date of Patent: *Sep. 5, 2017

(54) METHOD, SYSTEM, NETWORK ELEMENT, AND GATEWAY FOR PROCESSING ACCESS POINT NAME RESTRICTION INFORMATION

(71) Applicant: Huawei Technologies Co., Ltd.

(72) Inventors: Caixia Qi, Shanghai (CN); Yu Yin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/547,404

(22) Filed: Nov. 19, 2014

(65) Prior Publication Data

US 2015/0078254 A1    Mar. 19, 2015

Related U.S. Application Data

(63) Continuation of application No. 13/295,570, filed on Nov. 14, 2011, now Pat. No. 8,908,641, which is a
(Continued)

(30) Foreign Application Priority Data

May 14, 2009   (CN) .......................... 2009 1 0084419

(51) Int. Cl.
*H04W 48/16* (2009.01)
*H04W 12/08* (2009.01)
(Continued)

(52) U.S. Cl.
CPC ............ *H04W 48/16* (2013.01); *H04W 12/08* (2013.01); *H04W 36/12* (2013.01); *H04W 48/02* (2013.01);
(Continued)

(58) Field of Classification Search
CPC .................. H04W 48/00; H04W 48/02–48/20
See application file for complete search history.

(56) References Cited

U.S. PATENT DOCUMENTS 8,566,455 B1 * 10/2013 Zhao et al. ................... 709/227
8,599,790 B1 * 12/2013 Damle et al. ................. 370/331
(Continued)

FOREIGN PATENT DOCUMENTS

| CN | 1593070 A | 3/2005 |
| CN | 101052209 A | 10/2007 |

(Continued)

OTHER PUBLICATIONS

"3GPP TS 29.274 V8.1.1 (Mar. 2009), Technical Specification, 3rd Generation Partnership Project; Technical Specification Group Core Network and Terminals; 3 GPP Evolved Packet System (EPS); Evolved General Packet Radion Service (GPRS) Tunnelling Protocol for Control Plan (GTPv2-C), Stage 3 (Release 8)," 116 pages.
(Continued)

*Primary Examiner* — Timothy J Weidner
(74) *Attorney, Agent, or Firm* — Slater Matsil, LLP

(57) ABSTRACT

A method, a system, a network element, and a gateway for processing access point name restriction information are disclosed. The method includes a second mobility management element receives first access point name restriction information from a first mobility management element, and the second mobility management element obtains maximum access point name restriction information according to the first access point name restriction information, so that a packet data network gateway determines to or refuses to establish a new packet data network gateway connection. With the present invention, the second mobility management element may obtain the maximum access point name restriction information according to the received access point name restriction information. In this way, the packet data network
(Continued)

gateway can determine to or refuse to establish a new packet data network gateway connection, therefore improving the security of private packet data network gateways.

22 Claims, 11 Drawing Sheets

Related U.S. Application Data continuation of application No. PCT/CN2010/072700, filed on May 13, 2010.

(51) Int. Cl.

| | |
|---|---|
| H04W 36/12 | (2009.01) |
| H04W 48/02 | (2009.01) |
| H04W 48/04 | (2009.01) |
| H04W 88/08 | (2009.01) |
| H04W 88/14 | (2009.01) |
| H04W 88/16 | (2009.01) |

(52) U.S. Cl.
CPC ............ *H04W 48/04* (2013.01); *H04W 88/08* (2013.01); *H04W 88/14* (2013.01); *H04W 88/16* (2013.01)

(56) References Cited

U.S. PATENT DOCUMENTS

| | | | |
|---|---|---|---|
| 8,908,641 B2 * | 12/2014 | Qi et al. ................ | 370/331 |
| 2004/0039906 A1 * | 2/2004 | Oka et al. .................... | 713/156 |
| 2005/0147062 A1 * | 7/2005 | Khouaja et al. ............. | 370/332 |
| 2007/0017823 A1 * | 1/2007 | Aiken et al. ................ | 205/777.5 |
| 2007/0171823 A1 | 7/2007 | Hunt et al. | |
| 2007/0226780 A1 * | 9/2007 | Ronneke ......................... | 726/3 |
| 2009/0093232 A1 * | 4/2009 | Gupta et al. ................. | 455/410 |
| 2009/0111428 A1 * | 4/2009 | Blommaert et al. ......... | 455/411 |
| 2009/0196255 A1 * | 8/2009 | Gulbani et al. ............... | 370/331 |
| 2011/0170517 A1 * | 7/2011 | Bakker et al. ................ | 370/331 |
| 2011/0199987 A1 * | 8/2011 | Rommer et al. ............. | 370/329 |
| 2012/0133552 A1 * | 5/2012 | Wu ........................... | 342/357.23 |
| 2013/0107863 A1 * | 5/2013 | Faccin et al. ................. | 370/331 |
| 2014/0213264 A1 * | 7/2014 | Park et al. .................... | 455/438 |

FOREIGN PATENT DOCUMENTS

| | | |
|---|---|---|
| CN | 101472273 A | 7/2009 |
| CN | 101801102 A | 8/2010 |
| CN | 101888617 B | 8/2013 |
| WO | 2007122297 A1 | 11/2007 |

OTHER PUBLICATIONS

"DRX Parameter Handling in LTE, 2G and 3G and Associated Corrections," 3GPP TSG-SA WG2 Meeting #68, Qing Dao, China, Oct. 13-17, 2008, rev of S2-087154; 23.060 CR 0740; rev 3; 8.2.0, 28 pages.

"Align E-UTRAN Initial Attach with GTPv2 Message Names," 3GPP TSG-SA WG2 Meeting #73, Tallinn, Estonia, May 11-15, 2009, rev of 2223, 2294; 23.401 CR 0916; rev 2; 10 pages.

"3rd Generation Partnership Project; Technical Specificatoin Group Services and System Aspects; General packet Radio Service (GPRS) enhancements for Evolved Universal Terrestrial Radio Access Network (E-UKTRAN) access (Release 8)," 3GPP TS 23.401 V8.5.0, Mar. 2009, 223 pages.

"Annex D.3.3 Message Alignment to Stage 3," 3GPP TSG-SA WG2 Meeting #72, Hangzhou, China, Mar. 30 through Apr. 3, 2009, Change Request of 23.401 CR 0950, Revision 1, Version 9.0.0, 10 pages.

Nortel, Annex D.3.3 Message Alignment to Stage 3,3GPP TSG SA WG2 Meeting #72, TD S2-092319, Hangzhou, China, Mar. 30 Apr. 3, 2009, 7 pages.

Version "Connectivity to Default APM after TAU and PS Handover to EUTRAN," 3 GPP TSG-SA WG2 #65, S2-084177, Version 8.1.0, Change Request, Prague, Czech Republic, May 12-16, 2008, 17 pages.

* cited by examiner

METHOD, SYSTEM, NETWORK ELEMENT, AND GATEWAY FOR PROCESSING ACCESS POINT NAME RESTRICTION INFORMATION

This application is a continuation of U.S. application Ser. No. 13/295,570, filed on Nov. 14, 2011, which is a continuation of International Application No. PCT/CN2010/072700, filed on May 13, 2010, which claims priority to Chinese Patent Application No. 200910084419.9, filed on May 14, 2009, all of which are hereby incorporated by reference in their entirety.

TECHNICAL FIELD

The present invention relates to the communications field, and in particular, to a method, a system, a mobility management element, and a serving gateway (SGW) for processing access point name (APN) restriction information.

BACKGROUND

On a next generation mobile communication network, a user equipment (UE) gets access through a local radio access network (RAN). A mobility management element is responsible for implementing functions such as location management, connection management, security authentication, and gateway selection of the UE. An SGW is a local access gateway of the UE and is responsible for access technology related connection management and data forwarding. A packet data network gateway (PGW) is a gateway for the UE to access an external packet data network (PDN)

In a mobility management procedure, the SGW sends a Modify Bearer Request to the PGW; the PGW carries a PDN-connection-related APN restriction value in a Modify Bearer Response, and sends the Modify Bearer Response to the SGW. However, before the SGW sends the Modify Bearer Request, the SGW needs to judge whether to send the Modify Bearer Request. That is, in certain cases, the SGW may not send the Modify Bearer Request to the PGW. Consequently, the PGW cannot send the PDN-connection-related APN restriction value to a target mobility management element, and the target mobility management element cannot obtain a correct maximum APN restriction value. When the UE requests establishing a new PDN connection, if the target mobility management element sends an incorrect maximum APN restriction value to the PGW, the PGW may allow some PDN connections that should be rejected according to the incorrect maximum APN restriction value. This brings about security threats to some private PDNs.

SUMMARY

Embodiments of the present invention provide a method, a system, a network element, and a gateway for processing APN restriction information to obtain correct maximum APN restriction information and improve the security of private PDNs.

An embodiment method for processing APN restriction information includes receiving, by a second mobility management element, first APN restriction information sent by a first mobility management element, and obtaining, by the second mobility management element, maximum APN restriction information according to the first APN restriction information, so that a PGW determines to or refuses to establish a new PDN connection.

Another embodiment method for processing APN restriction information includes receiving, by an SGW, APN restriction information, storing, by the SGW, the APN restriction information, sending, by the SGW, the APN restriction information to a second mobility management element, and obtaining, by the second mobility management element, maximum APN restriction information according to the APN restriction information, so that a PGW determines to or refuses to establish a new PDN connection.

An embodiment of a mobility management element includes a processor and a non-transitory computer readable medium connected to the processor. The non-transitory computer readable medium has stored therein instructions for causing the processor to receive first APN restriction information sent by a first mobility management element, and obtain maximum APN restriction information according to the first APN restriction information, so that a PGW determines to, or refuses to, establish a new PDN connection.

An SGW includes a receiving module, configured to receive APN restriction information, a storing module, configured to store the APN restriction information, and a sending module, configured to send the APN restriction information to a second mobility management element.

An embodiment of a system for processing APN restriction information includes: a first mobility management element, configured to send first APN restriction information to a second mobility management element, the second mobility management element, configured to receive the first APN restriction information, and obtain maximum APN restriction information according to the first APN restriction information, so that a PGW determines to or refuses to establish a new PDN connection.

Another embodiment of a system for processing APN restriction information includes an SGW, configured to receive and store APN restriction information, and send the APN restriction information to a second mobility management element, and the second mobility management element, configured to obtain maximum APN restriction information according to the APN restriction information, so that a PGW determines to or refuses to establish a new PDN connection.

In embodiments of the present invention, the second mobility management element may receive the APN restriction information sent by the first mobility management element or pre-stored APN restriction information sent by the SGW, and then obtain the maximum APN restriction information according to the received APN restriction information. In this way, the PGW can determine to or refuse to establish a new PDN connection, and therefore the security of private PDNs is improved.

DETAILED DESCRIPTION OF ILLUSTRATIVE EMBODIMENTS

The present invention is hereinafter described in detail with reference to the accompanying drawings and exemplary embodiments.

The technical solution provided in embodiments of the present invention may be applied in a mobility management procedure. The mobility management procedure is a procedure that an access network, a mobility management element, an SGW or a PGW that serves a UE is handed over due to a location change of the UE or equipment load balancing. All the procedures involved in embodiments of the present invention refer to a mobility management procedure.

Figure 1:
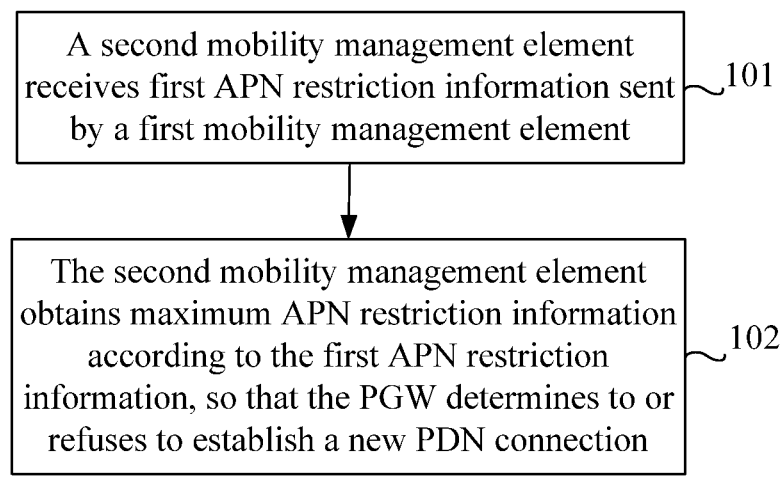
FIG. 1 is a flowchart of a method for processing APN restriction information according to a first embodiment of the present invention.

FIG. 1 is a flowchart of a method for processing APN restriction information according to a first embodiment of the present invention. As shown in FIG. 1, the method includes the following steps:

Step 101: A second mobility management element receives first APN restriction information sent by a first mobility management element.

Step 102: The second mobility management element obtains maximum APN restriction information according to the first APN restriction information, so that a PGW determines to or refuses to establish a new PDN connection.

In this embodiment, the second mobility management element may receive the first APN restriction information sent by the first mobility management element, and then obtain the maximum APN restriction information according to the first APN restriction information. In this way, the PGW can determine to or refuse to establish a new PDN connection, and therefore the security of private PDNs is improved.

Figure 2:
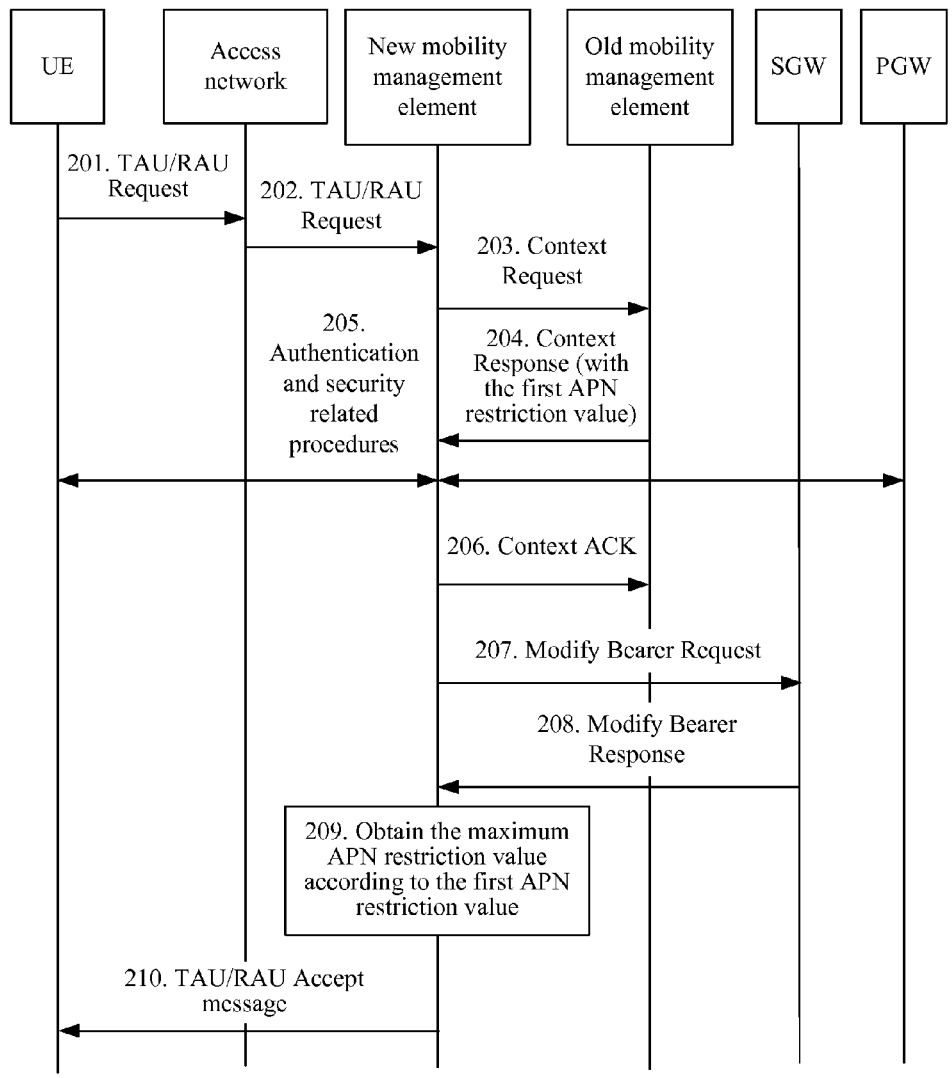
FIG. 2 is a signaling flowchart of a method for processing APN restriction information according to a second embodiment of the present invention.

FIG. 2 is a signaling flowchart of a method for processing APN restriction information according to a second embodiment of the present invention. In this embodiment, a first mobility management element is an old mobility management element, and a second mobility management element is a new mobility management element. The old mobility management element serves a UE before a mobility management procedure. The new mobility management element serves the UE after a mobility management element is handed over in the mobility management procedure. First APN restriction information is a first APN restriction value, and maximum APN restriction information is a maximum APN restriction value.

The following describes the technical solution provided in the second embodiment by taking a tracking area update (TAU) procedure or a routing area update (RAU) procedure on a next generation mobile communication network as an example. In this embodiment, the first APN restriction is carried in a Context Response.

When the method provided in this embodiment is applied in the TAU procedure, an access network may be an evolved NodeB (eNodeB), the new mobility management element may be a mobility management entity (MME), and the old mobility management element may be an MME or a serving GPRS support node (SGSN). When the method provided in this embodiment is applied in the RAU procedure, the access network may be a serving radio network subsystem (SRNS) or a base station subsystem (BSS), the new mobility management element may be an SGSN, and the old mobility management element may be an MME or an SGSN.

As shown in FIG. 2, the method provided in the second embodiment of the present invention includes the following steps:

Step 201: The UE sends a TAU/RAU Request to the access network.

Step 202: The access network sends the TAU/RAU Request to the new mobility management element.

Step 203: The new mobility management element sends a Context Request to the old mobility management element according to the received TAU/RAU Request, which is used for requesting obtaining UE related information from the old mobility management element.

Step 204: The old mobility management element sends a Context Response to the new mobility management element, where the Context Response carries a first APN restriction value corresponding to a currently established PDN connection of the UE.

The new mobility management element may obtain a maximum APN restriction value directly according to the first APN restriction value. This step is optional.

Step 205: Execute authentication and security related procedures initiated by the new mobility management element.

Step 206: The new mobility management element sends a Context ACK to the old mobility management element. Then, the UE context establishment procedure ends.

Step 207: The new mobility management element sends a Modify Bearer Request to an SGW.

Step 208: When the SGW determines that the Modify Bearer Request does not need to be sent to a PGW, the SGW sends a Modify Bearer Response to the new mobility management element.

Specifically, the new mobility management element may carry a radio access type (RAT) in a Modify Bearer Request sent to the SGW. The SGW compares the RAT carried in the Modify Bearer Request with an RAT stored on the SGW; if both RATs are the same, the SGW determines that the Modify Bearer Request does not need to be sent to the PGW. Or the SGW judges whether the Modify Bearer Request sent by the new mobility management element includes user location information (ULI); if the Modify Bearer Request does not include the ULI, the SGW determines that the Modify Bearer Request does not need to be sent to the PGW. Or the SGW judges whether the Modify Bearer Request sent by the new mobility management element includes instruction information that is used to instruct the SGW to send a Modify Bearer Request to the PGW; if the Modify Bearer Request does not include the instruction information, the SGW determines that the Modify Bearer Request does not need to be sent to the PGW.

Step 210: The new mobility management element sends a TAU/RAU Accept message to the UE.

Further, if the step of obtaining the maximum APN restriction value according to the first APN restriction value is not executed in step 204, step 209 is included between step 208 and step 210, that is, the new mobility management element obtains the maximum APN restriction value directly according to the first APN restriction value.

In this embodiment, one UE may have multiple APN restriction values. The maximum APN restriction values may be decided by using multiple methods, for example, the maximum value of all the APN restriction values of the UE. The specific method is not limited in this embodiment. If the UE established multiple PDN connections, one Context Response generally carries multiple first APN restriction values. In this way, the new mobility management element may obtain multiple first APN restriction values corresponding to all the PDN connections of the UE by receiving a Context Response, and then choose the maximum one of the multiple first APN restriction values to obtain the maximum APN restriction value.

If the UE establishes a PDN connection, the new mobility management element obtains a first APN restriction value corresponding to the PDN connection of the UE by receiving a Context Response, where the first APN restriction value is the maximum APN restriction value.

When the UE requests establishing a new PDN connection, the new mobility management element sends the maximum APN restriction value obtained according to the first APN restriction value to the PGW, so that the PGW determines to or refuses to establish the PDN connection.

Some location registration procedures may be included between step 209 and step 210, and are not further described.

In this embodiment, the new mobility management element may receive the first APN restriction information sent by the old mobility management element, and obtain the maximum APN restriction information directly according to the first APN restriction information, so that the PGW determines to or refuses to establish a new PDN connection. When the SGW cannot obtain APN restriction information through the Modify Bearer message, the new mobility management element can also obtain accurate maximum APN restriction information, and notify the PGW of the maximum APN restriction information. In this way, private PDNs may be free from security threats due to the fact that the PGW cannot determine whether to establish a new PDN connection or the fact that the PGW determines whether to establish a new PDN connection by using incorrect maximum APN restriction information because the PGW does not know the maximum APN restriction information. In this way, the security of private PDNs is improved.

Figure 3:
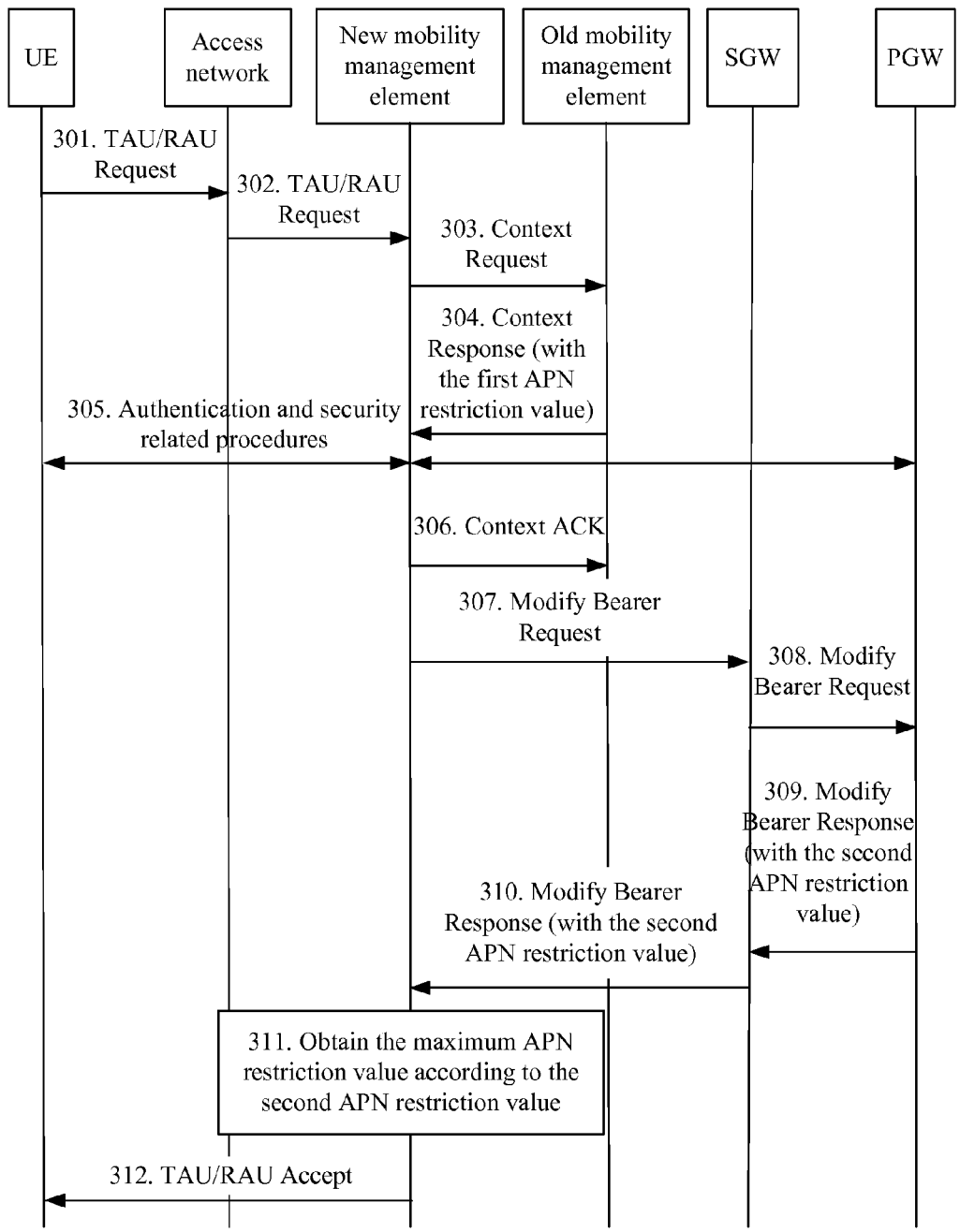
FIG. 3 is a signaling flowchart of a method for processing APN restriction information according to a third embodiment of the present invention.

FIG. 3 is a signaling flowchart of a method for processing APN restriction information according to a third embodiment of the present invention. Step 301 to step 307 in this embodiment are the same as step 201 to step 207 in the second embodiment, and step 312 is the same as step 210 in the second embodiment. The method further includes the following steps:

Step 308: When the SGW knows that the Modify Bearer Request needs to be sent to the PGW, the SGW sends a Modify Bearer Request to the PGW.

Step 309: The PGW returns a Modify Bearer Response to the SGW, where the Modify Bearer Response carries a second APN restriction value corresponding to the current PDN connection of the UE.

Step 310: The SGW sends a Modify Bearer Response that carries the second APN restriction value to the new mobility management element.

Step 311: The new mobility management element compares the first APN restriction value and the second APN restriction value to check whether they are the same. If the first APN restriction value and the second APN restriction value are not the same, the new mobility management element ignores the first APN restriction value or the maximum APN restriction value obtained according to the first APN restriction value, stores the second APN restriction value, and obtains a maximum APN restriction value according to the second APN restriction value.

In this embodiment, if the UE established multiple PDN connections, one Context Response generally carries multiple first APN restriction values. The new mobility management element may obtain multiple first APN restriction values corresponding to all the PDN connections of the UE through one Context Response. A Modify Bearer Response generally carries a second APN restriction value, and the new mobility management element may obtain multiple second APN restriction values corresponding to all the PDN connections of the UE through multiple Modify Bearer Responses. Specifically, in step 311, the new mobility management element compares the first APN restriction value and the second APN restriction value that correspond to the same PDN connection to check whether they are the same. If the first APN restriction value and the second APN restriction value are not the same, the new mobility management element ignores the first APN restriction value corresponding to the PDN connection or the maximum APN restriction value obtained according to the first APN restriction value corresponding to the PDN connection, stores the second APN restriction value corresponding to the PDN connection, and obtains a maximum APN restriction value according to the second APN restriction value.

If the UE establishes a PDN connection, the new mobility management element obtains a first APN restriction value corresponding to the PDN connection of the UE by receiving a Context Response, and obtains a second APN restriction value corresponding to the PDN connection of the UE by receiving a Modify Bearer Response, where the second APN restriction value is the maximum APN restriction value.

When the UE requests establishing a new PDN connection, the new mobility management element sends the maximum APN restriction value obtained according to the second APN restriction value to the PGW, so that the PGW determines to or refuses to establish the PDN connection.

Further, in the preceding step 311, the new mobility management element may not compare the first APN restriction value with the second APN restriction value, but directly ignore the first APN restriction value or the maximum APN restriction value obtained according to the first APN restriction value, stores the second APN restriction value, and obtains a maximum APN restriction value according to the second APN restriction value.

The method provided in this embodiment is also applicable to a scenario where the SGW is changed. If the new mobility management element selects a new SGW for the UE, the new mobility management element sends a Create Session Request to the new SGW in step 307. The new SGW sends a Modify Bearer Request to the PGW in step 308 to step 310. The new SGW receives a Modify Bearer Response returned by the PGW, where the Modify Bearer Response carries a second APN restriction value corresponding to the current PDN connection of the UE. The new SGW sends a Create Session Response that carries the second APN restriction value to the new mobility management element.

In this embodiment, the new mobility management element may receive the first APN restriction information sent by the old mobility management element; when the SGW obtains the second APN restriction information through the Modify Bearer messages, the new mobility management element may obtain maximum APN restriction information according to the second APN restriction information, so that the PGW determines to or refuses to establish a new PDN connection. In this way, the security of private PDNs is improved.

Figure 4:
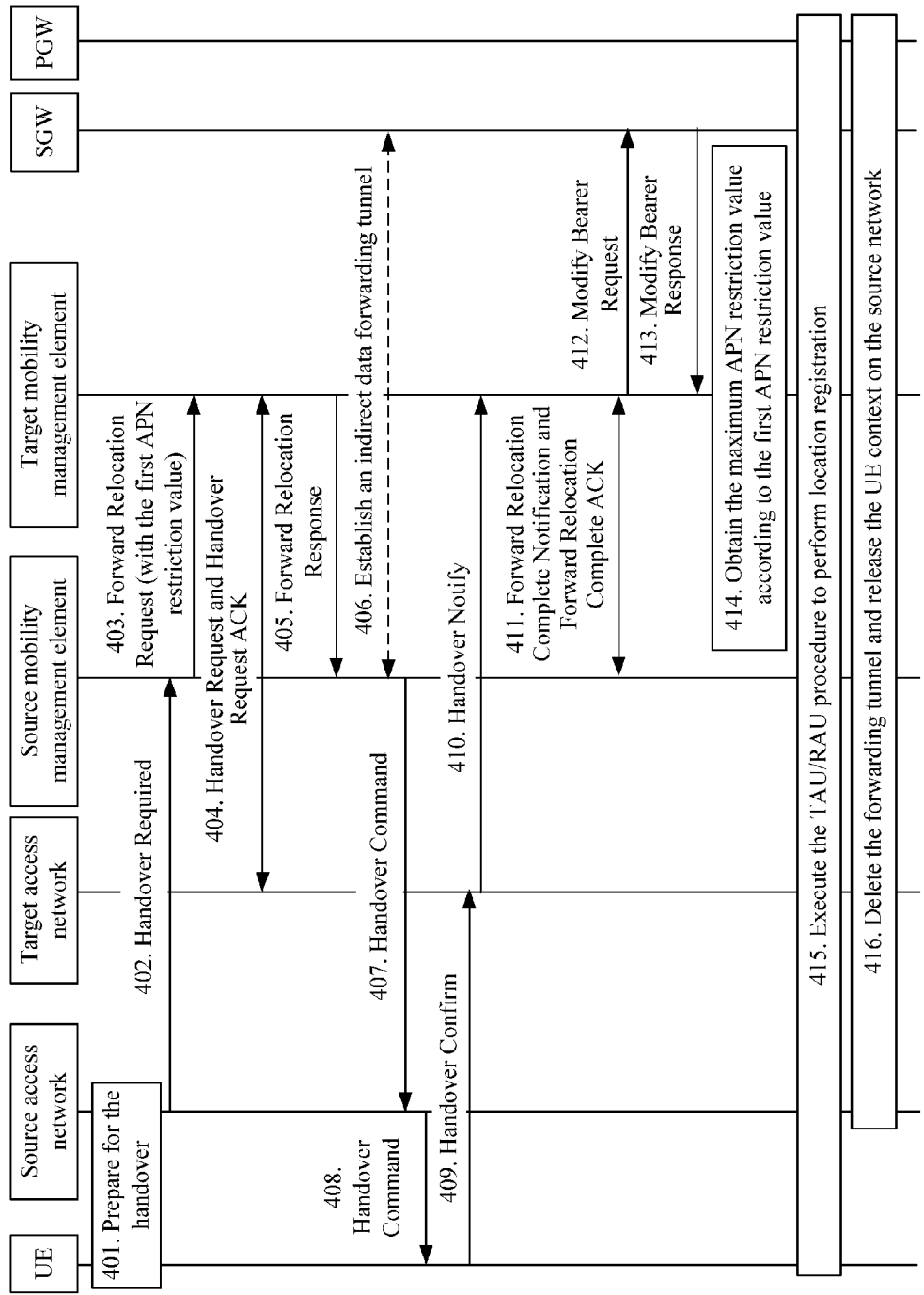
FIG. 4 is a signaling flowchart of a method for processing APN restriction information according to a fourth embodiment of the present invention.

FIG. 4 is a signaling flowchart of a method for processing APN restriction information according to a fourth embodiment of the present invention. In this embodiment, the first mobility management element is a source mobility management element, and the second mobility management element is a target mobility management element. The source mobility management element serves the UE before the mobility management procedure. The target mobility management element serves the UE after the mobility management element is handed over in the mobility management procedure. The first APN restriction information is the first APN restriction value, and the maximum APN restriction information is the maximum APN restriction value.

The following describes the technical solution of this embodiment by taking the handover procedure on the next generation mobile communication network as an example. In this embodiment, the first APN restriction value is carried in a Forward Relocation Request.

In this embodiment, a source access network or a target access network may be an eNodeB, an SRNS, or a BSS, the source mobility management element may be an MME or an SGSN, and the target mobility management element may be an MME or an SGSN. When the source mobility management element and the target mobility management element are both an SGSN, the method provided in this embodiment may correspond to such procedures as SRNS relocation, or combined hard handover and SRNS relocation, or combined cell/URA update and SRNS relocation, or enhanced SRNS relocation. The signaling message body in these handover or relocation procedures is the same as that shown in FIG. 4. The main differences lie in the names of some signaling messages and the interactions between a radio network and the UE.

As shown in FIG. 4, in the handover procedure, the SGW is not changed, that is, the SGW is a source SGW. The method provided in the fourth embodiment includes the following steps:

Step 401: The UE and the source access network prepare for the handover.

Step 402: The source access network sends a Handover Request to the source mobility management element.

Step 403: The source mobility management element sends a Forward Relocation Request to the target mobility management element, where the Forward Relocation Request carries a first APN restriction value corresponding to the current PDN connection of the UE.

The target mobility management element may obtain a maximum APN restriction value directly according to the first APN restriction value. This step is optional.

Step 404: The target mobility management element sends a Handover Request to the target access network, and then receives a Handover Request ACK returned by the target access network.

Step 405: The target mobility management element sends a Forward Relocation Response to the source mobility management element.

Step 406: The source mobility management element establishes an indirect data forwarding tunnel with the source SGW. This step is optional.

Step 407: The source mobility management element sends a Handover Command to the source access network.

Step 408: The source access network sends a Handover Command to the UE.

Step 409: The UE sends a Handover Confirm message to the target access network.

Step 410: The target access network sends a Handover Notify message to the target mobility management element.

Step 411: The target mobility management element sends a Forward Relocation Complete Notification to the source mobility management element, and then receives a Forward Relocation Complete ACK returned by the source mobility management element.

Step 412: The target mobility management element sends a Modify Bearer Request to the SGW.

Step 413: When the SGW determines that the Modify Bearer Request does not need to be sent to the PGW, the SGW sends a Modify Bearer Response to the target mobility management element.

Specifically, the target mobility management element may carry an RAT in a Modify Bearer Request sent to the SGW. The SGW compares the RAT carried in the Modify Bearer Request with an RAT stored on the SGW; if both RATs are the same, the SGW determines that the Modify Bearer Request does not need to be sent to the PGW. Or the SGW judges whether the Modify Bearer Request sent by the target mobility management element includes ULI; if the Modify Bearer Request does not include the ULI, the SGW determines that the Modify Bearer Request does not need to be sent to the PGW. Or the SGW judges whether the Modify Bearer Request sent by the target mobility management element includes instruction information that is used to instruct the SGW to send a Modify Bearer Request to the PGW; if the Modify Bearer Request does not include the instruction information, the SGW determines that the Modify Bearer Request does not need to be sent to the PGW.

Step 415: The mobility management element executes a TAU/RAU procedure to perform location registration.

Step 416: The forwarding tunnel is deleted, and the UE context on the source network is released. This step is optional.

Further, if the step of obtaining a maximum APN restriction value according to the first APN restriction value is not executed in step 403, step 414 is included between step 413 and step 415, that is, the target mobility management element obtains a maximum APN restriction value directly according to the first APN restriction value.

In this embodiment, one UE may have multiple APN restriction values. The maximum APN restriction value is the maximum one of all the APN restriction values of the UE. If the UE established multiple PDN connections, one Forward Relocation Request generally carries multiple first APN restriction values. In this way, the new mobility management element may obtain multiple first APN restriction values corresponding to all the PDN connections of the UE by receiving a Forward Relocation Request, and then choose the maximum one of multiple first APN restriction values to obtain the maximum APN restriction value.

If the UE establishes a PDN connection, the target mobility management element obtains a first APN restriction value corresponding to the PDN connection of the UE by receiving a Forward Relocation Request, where the first APN restriction value is the maximum APN restriction value.

When the UE requests establishing a new PDN connection, the target mobility management element sends the maximum APN restriction value obtained according to the first APN restriction value to the PGW, so that the PGW determines to or refuses to establish the PDN connection.

In this embodiment, the target mobility management element may receive the first APN restriction information sent by the source mobility management element, and obtain the maximum APN restriction information according to the first APN restriction information, so that the PGW determines to or refuses to establish a new PDN connection. When the SGW cannot obtain the APN restriction information through the Modify Bearer message, the target mobility management element can also obtain accurate maximum APN restriction information, and notify the PGW of the maximum APN restriction information. In this way, private PDNs may be free from security threats due to the fact that the PGW cannot determine whether to establish a new PDN connection or the fact that the PGW determines whether to establish a new PDN connection by using incorrect maximum APN restriction information because the PGW does not know the maximum APN restriction information. In this way, the security of private PDNs is improved.

Figure 5A:
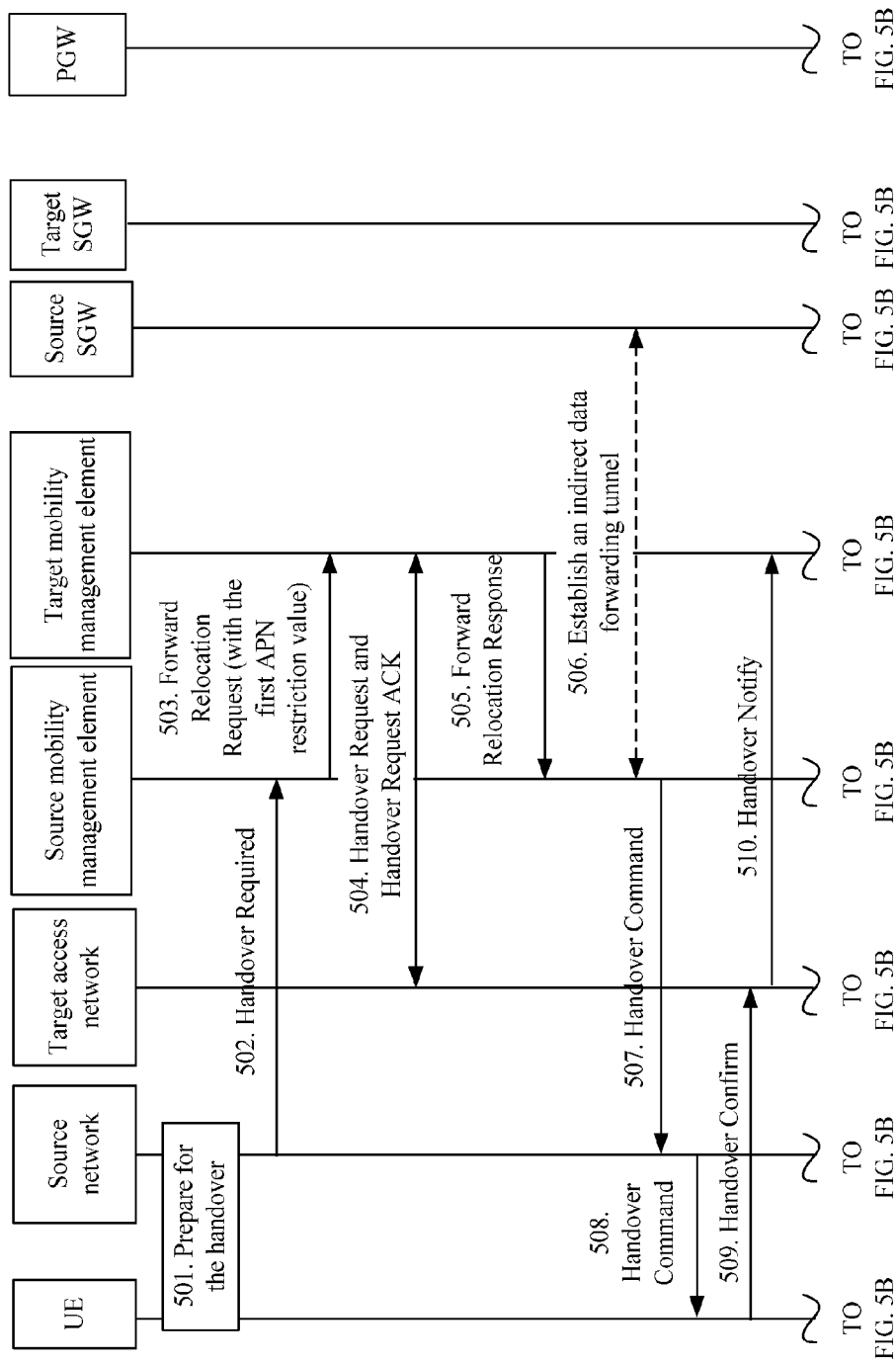
FIG. 5A and FIG. 5B are a signaling flowchart of a method for processing APN restriction information according to a fifth embodiment of the present invention.
Figure 5B:
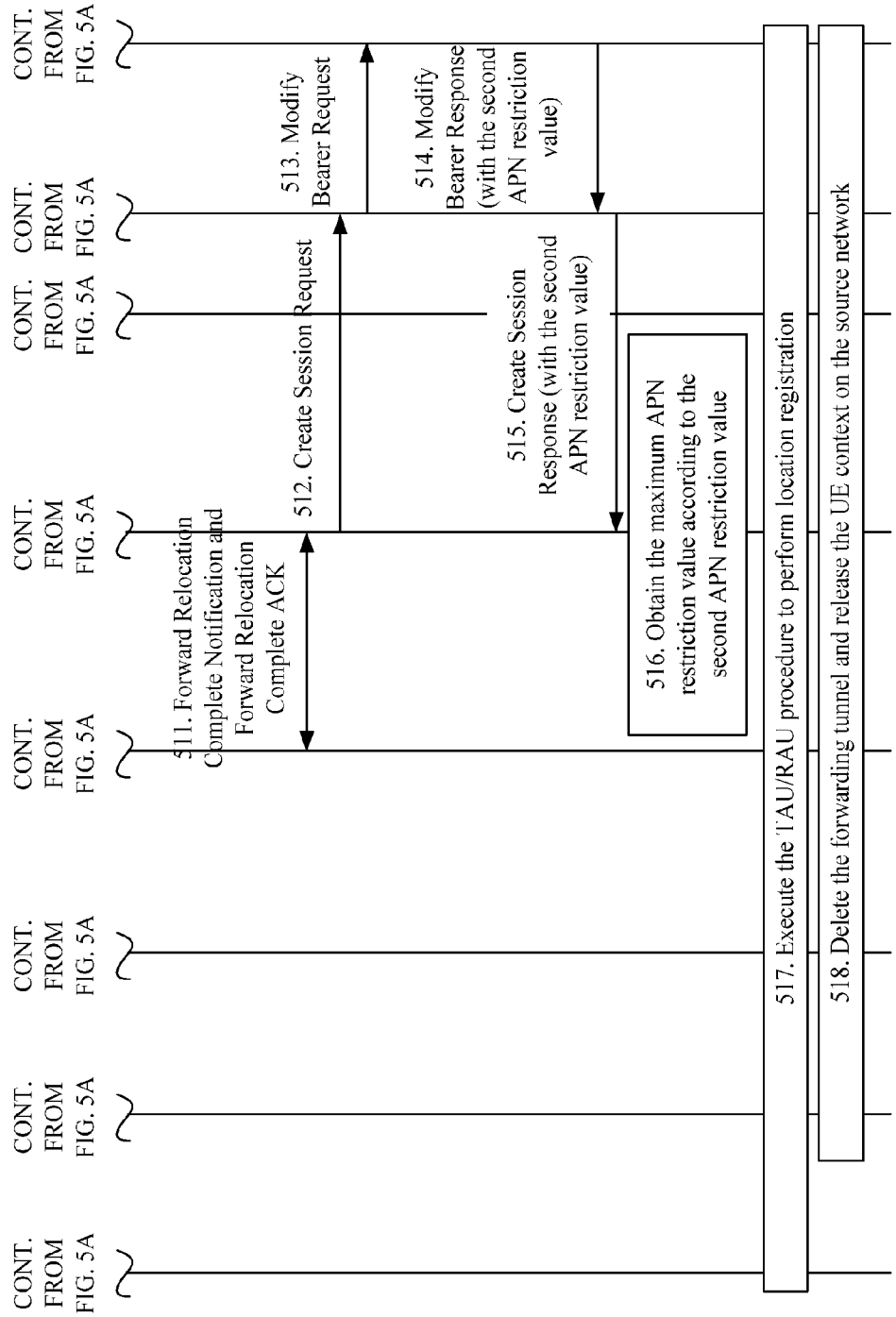

FIG. 5 is a signaling flowchart of a method for processing APN restriction information according to a fifth embodiment of the present invention. Step 501 to step 511 in this embodiment are the same as step 401 to step 411 in the fourth embodiment, and step 517 and step 518 are the same as step 415 and step 416 in the fourth embodiment respectively. The difference between the fifth embodiment and the fourth embodiment lies in that the SGW is changed in the handover procedure. The method provided in this embodiment includes the following steps:

Step 512: The target mobility management element sends a Create Session Request to a target SGW.

Step 513: The target SGW sends a Modify Bearer Request to the PGW.

Step 514: The PGW returns a Modify Bearer Response to the target SGW, where the Modify Bearer Response carries a second APN restriction value corresponding to the current PDN connection of the UE.

Step 515: The target SGW sends a Create Session Response to a target new mobility management element, where the Create Session Response carries a second APN restriction value corresponding to the current PDN connection of the UE.

Step 516: The target mobility management element compares the first APN restriction value and the second APN restriction value to check whether they are the same. If the first APN restriction value and the second APN restriction value are not the same, the target mobility management element ignores the first APN restriction value or the maximum APN restriction value obtained according to the first APN restriction value, stores the second APN restriction value, and obtains a maximum APN restriction value according to the second APN restriction value.

In this embodiment, if the UE established multiple PDN connections, one Forward Relocation Request generally carries multiple first APN restriction values. The target mobility management element may obtain multiple first APN restriction values corresponding to all the PDN connections of the UE through one Forward Relocation Request. A Modify Bearer Response and a Create Session Response generally carry a second APN restriction value, and the target mobility management element may obtain multiple second APN restriction values corresponding to all the PDN connections of the UE through multiple Modify Bearer Responses and Create Session Responses. Specifically, in step 516, the target mobility management element compares the first APN restriction value and the second APN restriction value that correspond to the same PDN connection to check whether they are the same. If the first APN restriction value and the second APN restriction value are not the same, the target mobility management element ignores the first APN restriction value corresponding to the PDN connection or the maximum APN restriction value obtained according to the first APN restriction value corresponding to the PDN connection, stores the second APN restriction value corresponding to the PDN connection, and obtains the maximum APN restriction value according to the second APN restriction value.

If the UE establishes a PDN connection, the target mobility management element obtains a first APN restriction value corresponding to the PDN connection by receiving a Forward Relocation Request, and obtains a second APN restriction value corresponding to the PDN connection of the UE by receiving a Modify Bearer Response and a Create Session Response, where the second APN restriction value is the maximum APN restriction value.

When the UE requests establishing a new PDN connection, the target mobility management element sends the maximum APN restriction value obtained according to the second APN restriction value to the PGW, so that the PGW determines to or refuses to establish the PDN connection.

The following step may be included between step 503 and step 504: The target mobility management element establishes a session with the target SGW. The following step may be included between step 504 and step 505: The target mobility management element establishes an indirect data forwarding tunnel with the target SGW.

Further, in the preceding step 516, the target mobility management element may not compare the first APN restriction value with the second APN restriction value, but directly ignores the first APN restriction value or the maximum APN restriction value obtained according to the first APN restriction value, stores the second APN restriction value, and obtains the maximum APN restriction value according to the second APN restriction value.

The method provided in this embodiment is also applicable to a scenario where the SGW is not changed and the SGW determines that the Modify Bearer Request needs to be sent to the PGW. Specifically, the preceding step 512 to step 516 are as follows: The target mobility management element sends a Modify Bearer Request to the source SGW; the source SGW sends a Modify Bearer Request to the PGW; the PGW returns a Modify Bearer Response to the source SGW, where the Modify Bearer Response carries a second APN restriction value corresponding to the current PDN connection of the UE; the source SGW sends a Modify Bearer Response to the target new mobility management element, where the Modify Bearer Response carries a second APN restriction value corresponding to the current PDN connection of the UE; the target mobility management element compares the first APN restriction value and the second APN restriction value to check whether they are the same, and if the first APN restriction value is not the same as the second APN restriction value, the target mobility management element ignores the first APN restriction value or the maximum APN restriction value obtained according to the first APN restriction value, stores the second APN restriction value, and obtains the maximum APN restriction value according to the second APN restriction value.

In this embodiment, the target mobility management element may receive the first APN restriction information sent by the source mobility management element; when the SGW obtains the second APN restriction information through a Modify Bearer message, the target mobility management element may obtain the maximum APN restriction information according to the second APN restriction information, so that the PGW determines to or refuses to establish a new PDN connection. In this way, the security of private PDNs is improved.

Figure 6:
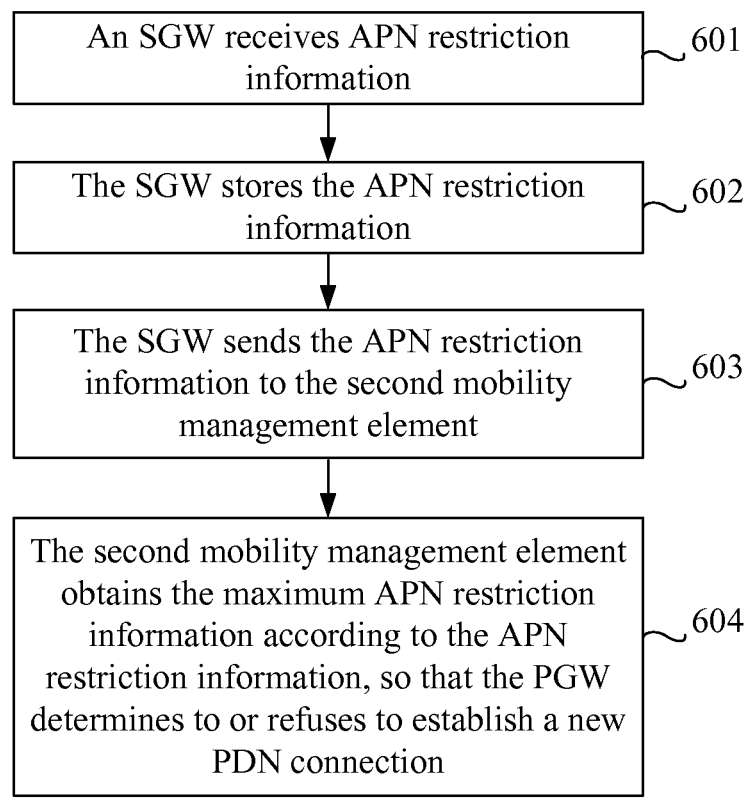
FIG. 6 is a flowchart of another method for processing APN restriction information according to a sixth embodiment of the present invention.

FIG. 6 is a flowchart of another method for processing APN restriction information according to a sixth embodiment of the present invention. As shown in FIG. 6, the method includes the following steps:

Step 601: An SGW receives APN restriction information.

Step 602: The SGW stores the APN restriction information.

Step 603: The SGW sends the APN restriction information to a second mobility management element.

Step 604: The second mobility management element obtains maximum APN restriction information according to the APN restriction information, so that the PGW determines to or refuses to establish a new PDN connection.

In this embodiment, the second mobility management element may receive the pre-stored APN restriction information sent by the SGW, and then obtain maximum APN restriction information according to the APN restriction information, so that the PGW determines to or refuses to establish a new PDN connection. In this way, the security of private PDNs is improved.

Figure 7:
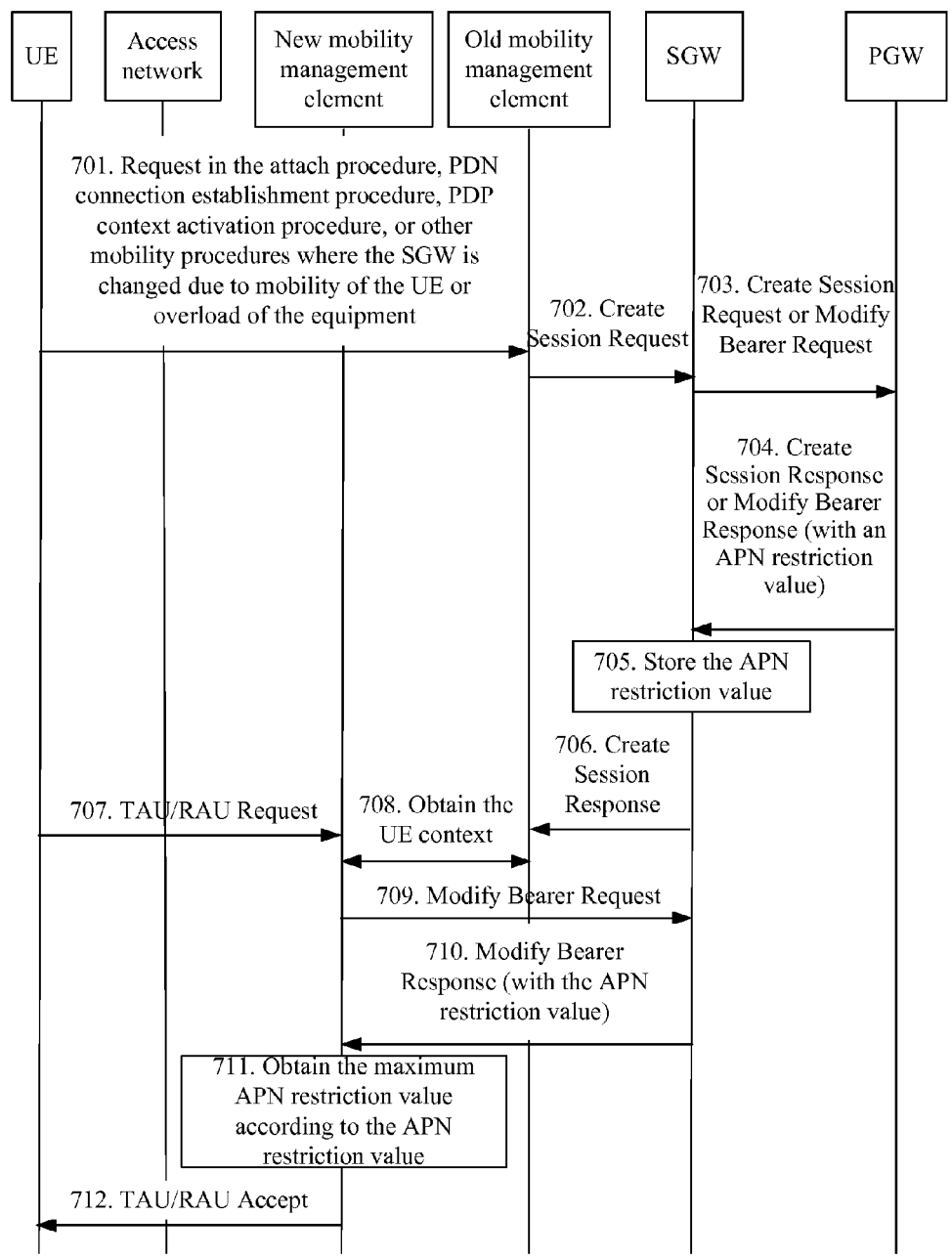
FIG. 7 is a signaling flowchart of another method for processing APN restriction information according to a seventh embodiment of the present invention.

FIG. 7 is a signaling flowchart of another method for processing APN restriction information according to a seventh embodiment of the present invention. In this embodiment, the second mobility management element is a new mobility management element, the APN restriction information is the APN restriction, and the maximum APN restriction information is the maximum APN restriction.

The following describes the technical solution of this embodiment by taking the TAU/RAU procedure on the next generation mobile communication network as an example. In this embodiment, in the attach procedure, PDN connection establishment procedure, Packet Data Protocol (PDP) context activation procedure or other mobility management procedures that the SGW is changed due to the mobility of the UE or overload of the equipment before the TAU/RAU procedure, the SGW stores the APN restriction value. The other mobility management procedures that the SGW is changed due to the mobility of the UE or overload of the equipment may be a TAU/RAU procedure, a handover procedure or a relocation procedure. The TAU/RAU procedure that the SGW is changed is not a same procedure as the subsequent TAU/RAU procedure.

When each network element shown in FIG. 7 corresponds to the attach procedure or the procedure that the UE requests establishing a PDN connection, the access network may be an eNodeB, and the old mobility management element may be an MME. When each network element shown in FIG. 7 corresponds to the PDP context activation procedure, the access network may be an SRNS or a BSS, and the old mobility management element may be an SGSN. When each network element shown in FIG. 7 corresponds to a TAU procedure, the access network may be an eNodeB, the new mobility management element may be an MME, and the old mobility management element may be an MME or an SGSN. When each network element shown in FIG. 7 corresponds to the RAU procedure, the access network may be an SRNS or a BSS, the new mobility management element may be an SGSN, and the old mobility management element may be an MME or an SGSN.

As shown in FIG. 7, the method provided in the seventh embodiment of the present invention includes the following steps:

Step 701: The UE sends a request of the attach procedure, PDN connection establishment procedure, PDP context activation procedure, or other mobility procedures that the SGW is changed due to the mobility of the UE or the overload of the equipment to the old mobility management element.

If the UE sends a request of the attach procedure, the PDN connection establishment procedure, or the PDP context activation procedure to the old mobility management element, the SGW in the following steps refers to the old SGW. If the UE sends a request of other mobility management procedures that the SGW is changed, the SGW in the following steps refers to the new SGW.

Step 702: The old mobility management element sends a Create Session Request to the SGW.

Step 703: The SGW sends a Create Session Request to the PGW. In other mobility management procedures that the SGW is changed, the Create Session Request is a Modify Bearer Request.

Step 704: The PGW returns a Create Session Response to the SGW, where the Create Session Response carries an APN restriction value corresponding to the current PDN connection of the UE; or the PGW returns a Modify Bearer Response that carries an APN restriction value corresponding to the current PDN connection of the UE.

Step 705: The SGW stores the APN restriction value.

Step 706: The SGW returns a Create Session Response to the old mobility management element.

Then, the attach procedure, the PDN connection establishment procedure, the PDP context activation procedure, the TAU/RAU procedure, the handover procedure, or the relocation procedure ends. In the attach procedure, PDN connection establishment procedure, PDP context activation procedure, TAU/RAU procedure, handover procedure, or relocation procedure, some operations such as interactions between the old mobility management element and the access network, location registration, and authentication are available. These operations have no direct relationship with the method provided in this embodiment, and are not further described.

Step 707: The UE sends a TAU/RAU Request to the new mobility management element.

Step 708: The new mobility management element interacts with the old mobility management element according to the received TAU/RAU Request to obtain a UE context.

Step 709: The new mobility management element sends a Modify Bearer Request to the SGW.

Step 710: When the SGW determines that the Modify Bearer Request does not need to be sent to the PGW, the SGW carries the APN restriction value stored on the SGW in a Modify Bearer Response, and sends the Modify Bearer Response to the new mobility management element.

Specifically, the new mobility management element may carry an RAT in a Modify Bearer Request sent to the SGW. The SGW compares the RAT carried in the Modify Bearer Request with an RAT stored on the SGW; if both RATs are the same, the SGW determines that the Modify Bearer Request does not need to be sent to the PGW. Or the SGW judges whether the Modify Bearer Request sent by the new mobility management element includes ULI; if the Modify Bearer Request does not include the ULI, the SGW determines that the Modify Bearer Request does not need to be sent to the PGW. Or the SGW judges whether the Modify Bearer Request sent by the new mobility management element includes instruction information that is used to instruct the SGW to send a Modify Bearer Request to the PGW; if the Modify Bearer Request does not include the instruction information, the SGW determines that the Modify Bearer Request does not need to be sent to the PGW.

Step 711: The new mobility management element obtains a maximum APN restriction value according to the APN restriction value.

Step 712: The new mobility management element sends a TAU/RAU Accept message to the SGW.

Further, in the preceding step 710, when the SGW sends a Modify Bearer Request to the PGW, the SGW may obtain an APN restriction value from the PGW, carry the APN restriction value in a Modify Bearer Response, and send the Modify Bearer Response to the new mobility management element.

When the UE requests establishing a new PDN connection, the new mobility management element sends the maximum APN restriction value obtained according to the APN restriction to the PGW, so that the PGW determines to or refuses to establish the PDN connection.

Some location registration procedures may be included between step 711 and step 712, and are not further described.

The method provided in this embodiment is also applicable to a scenario where the mobility management element is not changed. In the RAU procedure, the old mobility management element may be an SGSN; in the TAU procedure, the old mobility management element may be an MME. In this scenario, all the messages sent to the new mobility management element shown in FIG. 7 may be sent to the old mobility management element, and no interaction occurs between the new mobility management element and the old mobility management element.

It should be noted that in the prior art, the SGW transparently transmits, to the new mobility management element, the APN restriction value sent by the PGW, without processing the APN restriction. In this embodiment, in the attach procedure, PDN connection establishment procedure, PDP context activation procedure, TAU/RAU procedure, handover procedure or relocation procedure, the APN restriction value is stored on the SGW. Then, in step 710, the SGW carries the APN restriction value in a Modify Bearer Response, and sends the Modify Bearer Response to the new mobility management element.

In this embodiment, the new mobility management element may receive the APN restriction information stored on the SGW, and obtain maximum APN restriction information according to the APN restriction information, so that the PGW determines to or refuses to establish a new PDN connection. When the SGW cannot obtain the APN restriction information through the Modify Bearer message, the new mobility management element can also obtain accurate maximum APN restriction information, and notify the PGW of the maximum APN restriction information. In this way, private PDNs may be free from security threats due to the fact that the PGW cannot determine whether to establish a new PDN connection or the fact that the PGW determines whether to establish a new PDN by using incorrect maximum APN restriction information because the PGW does not know the maximum APN restriction information. In this way, the security of private PDNs is improved.

Figure 8A:
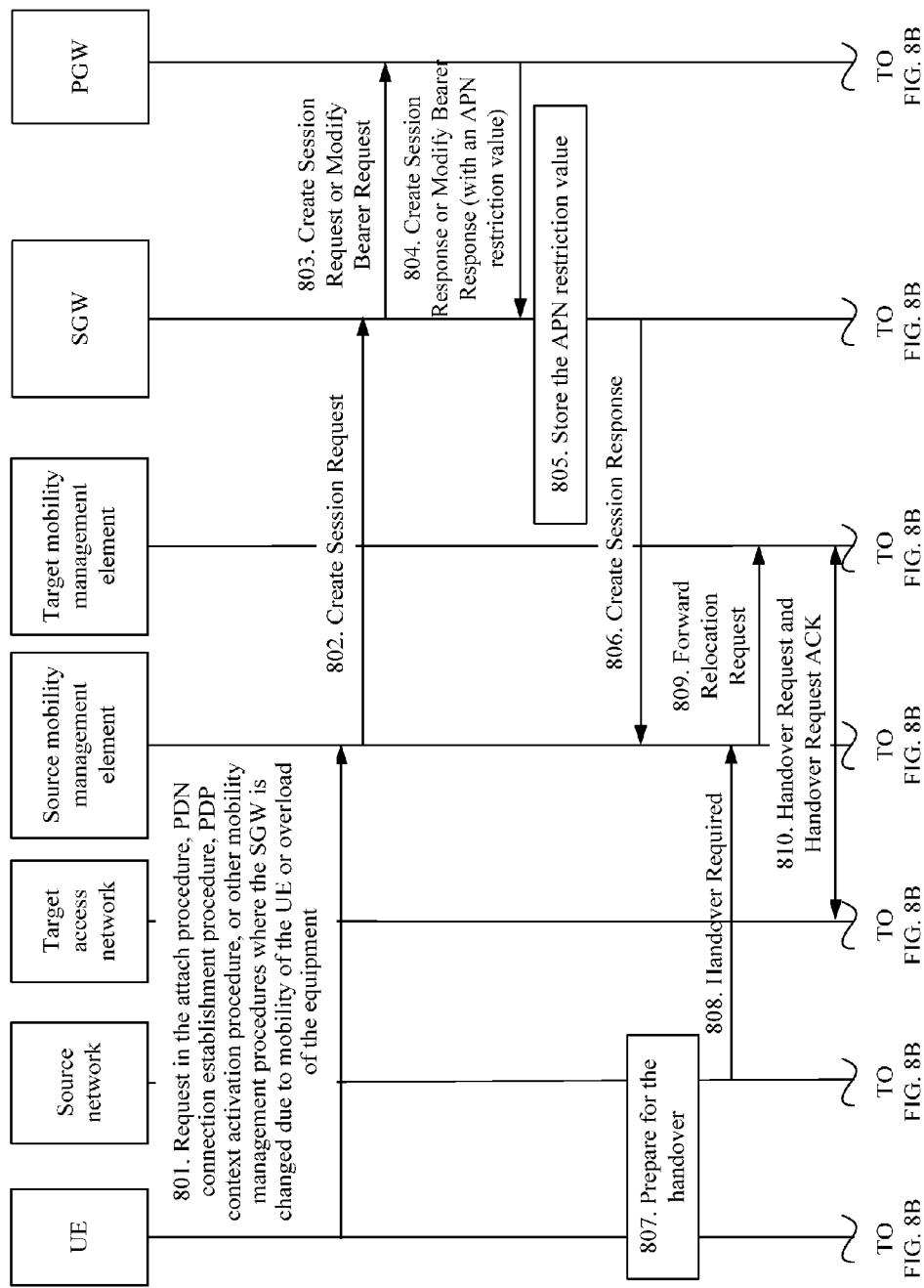
FIG. 8A and FIG. 8B are a signaling flowchart of another method for processing APN restriction information according to an eighth embodiment of the present invention.
Figure 8B:
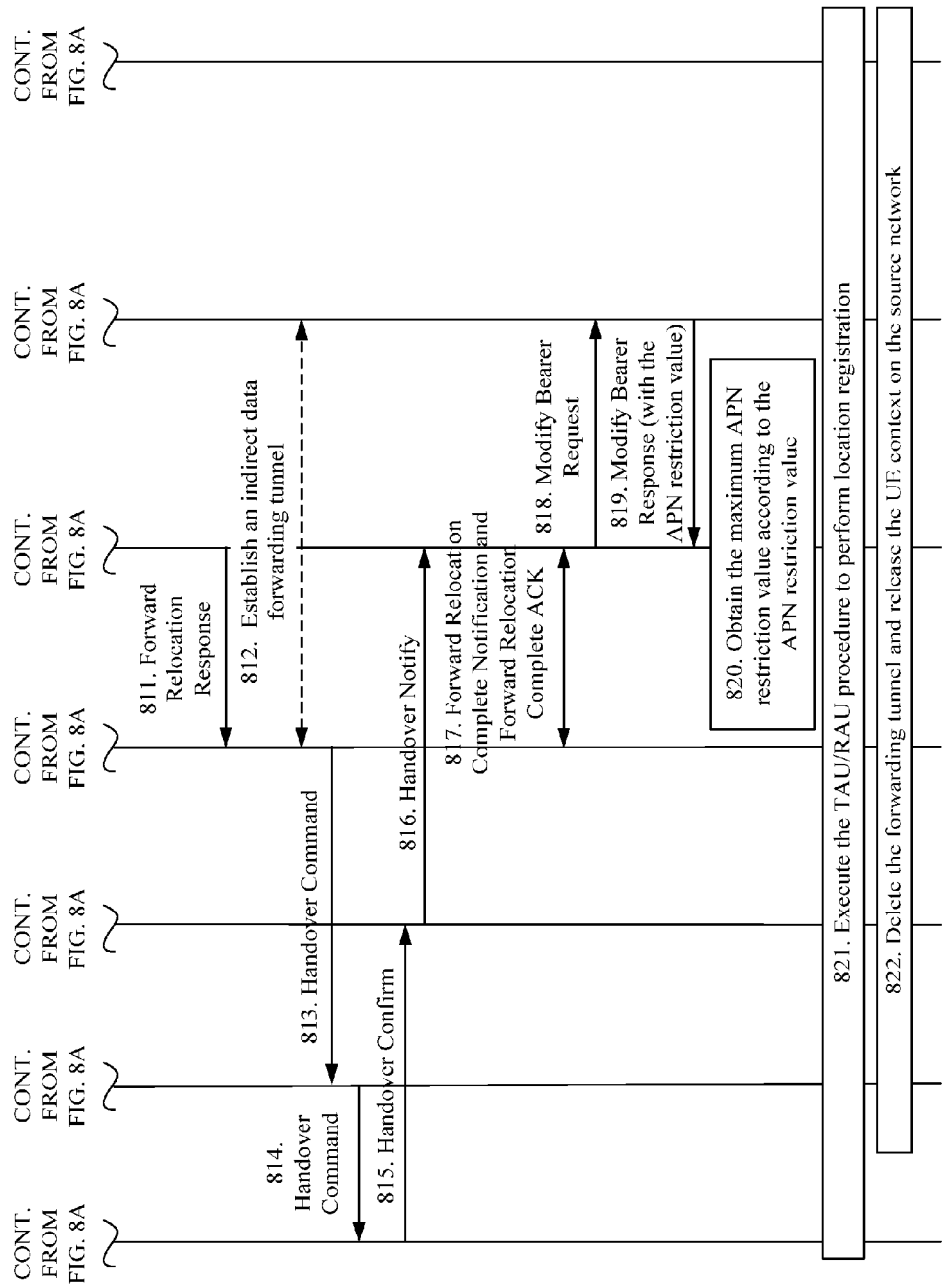

FIG. 8 is a signaling flowchart of another method for processing APN restriction information according to an eighth embodiment of the present invention. In this embodiment, the second mobility management element is the target mobility management element, the APN restriction information is the APN restriction value, and the maximum APN restriction information is the maximum APN restriction value.

The following describes the technical solution of this embodiment by taking the handover procedure on the next generation mobile communication network as an example. In this embodiment, in the attach procedure, PDN connection establishment procedure, PDP context activation procedure or other mobility management procedures that the SGW is changed due to the mobility of the UE or overload of the equipment before the handover procedure, the SGW stores the APN restriction. The other mobility management procedures that the SGW is changed due to the mobility of the UE or overload of the equipment may be a TAU/RAU procedure, a handover procedure or a relocation procedure. The handover procedure that the SGW is changed is not a same procedure from the subsequent handover procedure.

When each network element shown in FIG. 8 corresponds to the attach procedure or the procedure that the UE requests establishing a PDN connection, the access network may be an eNodeB, and the source mobility management element may be an MME. When each network element shown in FIG. 8 corresponds to the PDP context activation procedure, the access network may be an SRNS or a BSS, and the source mobility management element may be an SGSN. When each network element shown in FIG. 8 corresponds to the handover procedure, the access network may be an eNodeB, an SRNS or a BSS, the source mobility management element may be an MME or an SGSN, and the target mobility management element may be an MME or an SGSN. When the source mobility management element and the target mobility management element are both an SGSN, the method provided in this embodiment may correspond to such procedures as SRNS relocation, or combined hard handover and SRNS relocation, or combined cell/URA update and SRNS relocation, or enhanced SRNS relocation. The signaling message body in the handover or relocation procedures is the same as that shown in FIG. 8. The main differences lie in the names of some signaling messages and the interactions between the radio network and the UE.

As shown in FIG. 8, the method provided in the eighth embodiment of the present invention includes the following steps:

Step 801: The UE sends a request of the attach procedure, PDN connection establishment procedure, PDP context activation procedure, or other mobility management procedures that the SGW is changed due to the mobility of the UE or the overload of the equipment to the source mobility management element.

If the UE sends a request of the attach procedure, the PDN connection establishment procedure, or the PDP context activation procedure to the source mobility management element, the SGW in the following steps refers to the source SGW. If the UE sends a request of other mobility management procedures that the SGW is changed, the SGW in the following steps refers to the target SGW.

Step 802: The source mobility management element sends a Create Session Request to the SGW.

Step 803: The SGW sends a Create Session Request to the PGW. In other mobility management procedures that the SGW is changed, the Create Session Request is a Modify Bearer Request.

Step 804: The PGW returns a Create Session Response to the SGW, where the Create Session Response carries an APN restriction value corresponding to the current PDN connection of the UE. Or the PGW returns a Modify Bearer Response to the SGW, where the Modify Bearer Response carries an APN restriction value corresponding to the current PDN connection of the UE.

Step 805: The SGW stores the APN restriction value.

Step 806: The SGW returns a Create Session Response to the source mobility management element.

Then, the attach procedure, PDN connection establishment procedure, PDP context activation procedure, TAU/RAU procedure, handover procedure, or relocation procedure ends. It should be noted that, in the attach procedure, PDN connection establishment procedure, PDP context activation procedure, TAU/RAU procedure, handover procedure or relocation procedure, some operations such as interactions between the old mobility management element and the access network, location registration, and authentication are also available. These operations have no direct relationship with this method, and are not further described.

Step 807: The UE and the source access network prepare for the handover.

Step 808: The source access network sends a Handover Required message to the source mobility management element.

Step 809: The source mobility management element sends a Forward Relocation Request to the target mobility management element.

Step 810: The target mobility management element sends a Handover Request to the target access network, and then receives a Handover Request ACK returned by the target access network.

Step 811: The target mobility management element sends a Forward Relocation Response to the source mobility management element.

Step 812: The source mobility management element establishes an indirect data forwarding tunnel with the source SGW. This step is optional.

Step 813: The source mobility management element sends a Handover Command to the source access network.

Step 814: The source access network sends a Handover Command to the UE.

Step 815: The UE sends a Handover Confirm message to the target access network.

Step 816: The target access network sends a Handover Notify message to the target mobility management element.

Step 817: The target mobility management element sends a Forward Relocation Complete Notification to the source mobility management element, and then receives a Forward Relocation Complete ACK returned by the source mobility management element.

Step 818: The target mobility management element sends a Modify Bearer Request to the SGW.

Step 819: When the SGW determines that the Modify Bearer Request does not need to be sent to the PGW, the SGW carries the APN restriction value stored on the SGW in a Modify Bearer Response, and sends the Modify Bearer Response to the target mobility management element.

Specifically, the target mobility management element may carry an RAT in a Modify Bearer Request sent to the SGW. The SGW compares the RAT carried in the Modify Bearer Request with an RAT stored on the SGW; if both RATs are the same, the SGW determines that the Modify Bearer Request does not need to be sent to the PGW. Or the SGW judges whether the Modify Bearer Request sent by the target mobility management element includes ULI; if the Modify Bearer Request does not include the ULI, the SGW determines that the Modify Bearer Request does not need to be sent to the PGW. Or the SGW judges whether the Modify Bearer Request sent by the target mobility management element includes instruction information that is used to instruct the SGW to send a Modify Bearer Request to the PGW; if the Modify Bearer Request does not include the instruction information, the SGW determines that the Modify Bearer Request does not need to be sent to the PGW.

Step 820: The target mobility management element obtains a maximum APN restriction value according to the APN restriction value.

Step 821: The mobility management element executes the TAU/RAU procedure to perform location registration.

Step 822: The forwarding tunnel is deleted, and the UE context on the source network is released.

Further, in the preceding step 819, when the SGW sends a Modify Bearer Request to the PGW, the SGW may obtain an APN restriction value from the PGW, carry the APN restriction value in a Modify Bearer Response, and send the Modify Bearer Response to the target mobility management element.

When the UE requests establishing a new PDN connection, the target mobility management element sends the maximum APN restriction value obtained according to the APN restriction value to the PGW, so that the PGW determines to or refuses to establish the PDN connection.

The method provided this embodiment is also applicable to a scenario where the mobility management element is not changed. In this scenario, all the messages sent to the target mobility management element shown in FIG. 8 are sent to the source mobility management element, and no interaction occurs between the target mobility management element and the source mobility management element.

It should be noted that in the prior art, the SGW transparently transmits the APN restriction value sent by the PGW to the target mobility management element, without processing the APN restriction value. In this embodiment, in the attach procedure, PDN connection establishment procedure, PDP context activation procedure, TAU/RAU procedure, handover procedure or relocation procedure, the APN restriction value is stored on the SGW. Then, in step 819, the SGW carries the APN restriction value in a Modify Bearer Response, and sends the Modify Bearer Response to the target mobility management element.

In this embodiment, the target mobility management element may receive the APN restriction information stored on the SGW, and obtain maximum APN restriction information according to the APN restriction information, so that the PGW determines to or refuses to establish a new PDN connection. When the SGW cannot obtain the APN restriction information through the Modify Bearer message, the target mobility management element can also obtain accurate maximum APN restriction information, and notify the PGW of the maximum APN restriction information. In this way, private PDNs may be free from security threats due to the fact that the PGW cannot determine whether to establish a new PDN connection or the fact that the PGW determines whether to establish a new PDN connection by using incorrect maximum APN restriction information because the PGW does not know the maximum APN restriction information. In this way, the security of private PDNs is improved.

Figure 9:
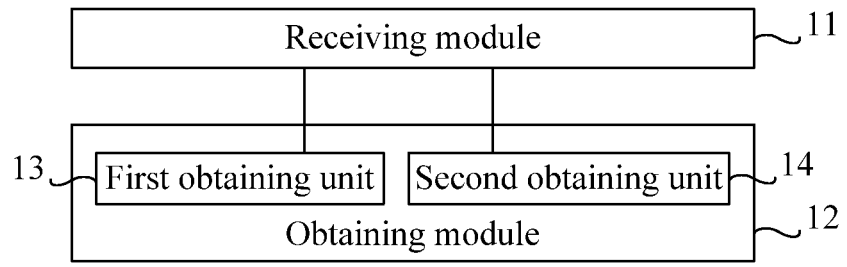
FIG. 9 shows a structure of a mobility management element according to a ninth embodiment of the present invention.

FIG. 9 shows a structure of a mobility management element according to a ninth embodiment of the present invention. As shown in FIG. 9, the mobility management element includes a receiving module 11 and an obtaining module 12. The receiving module 11 receives first APN restriction information from a first mobility management element. The obtaining module 12 obtains maximum APN restriction information according to the first APN restriction information, so that the PGW determines to or refuses to establish a new PDN connection.

Specifically, in a TAU/RAU procedure, the mobility management element provided in this embodiment may be a new mobility management element, and the first mobility management element may be an old mobility management element. Therefore, the receiving module 11 is configured to receive first APN restriction information carried in a Context Response sent by the old mobility management element. In the handover procedure, the mobility management element provided in this embodiment may be a target mobility management element, and the first mobility management element may be a source mobility management element. Therefore, the receiving module 11 is configured to receive first APN restriction information carried in a Forward Relocation Request sent by the source mobility management element.

Further, as an implementation mode, the obtaining module 12 may include a first obtaining unit 13 that may obtain maximum APN restriction information directly according to the first APN restriction information. The implementation mode of this embodiment may be applicable to the method provided in the second embodiment or the fourth embodiment.

As another implementation mode, the receiving module 11 may be further configured to receive second APN restriction information sent by the SGW, and the obtaining module 12 may include a second obtaining unit 14. When the first APN restriction information is different from the second APN restriction information, the second obtaining unit 14 obtains maximum APN restriction information according to the second APN restriction information. The implementation mode of this embodiment may be applicable to the method provided in the third embodiment or the fifth embodiment.

The mobility management element provided in this embodiment may receive the first APN restriction information sent by the first mobility management element, and then obtain the maximum APN restriction information according to the first APN restriction information, so that the PGW can determine to or refuse to establish a new PDN connection. In this way, the security of private PDNs is improved.

Figure 10:
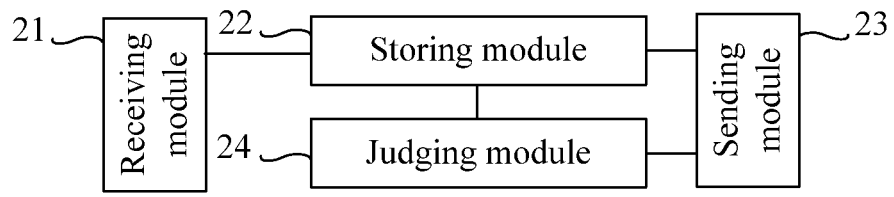
FIG. 10 shows a structure of an SGW according to a tenth embodiment of the present invention.

FIG. 10 shows a structure of an SGW according to a tenth embodiment of the present invention. As shown in FIG. 10, the SGW includes a receiving module 21, a storing module 22, and a sending module 23. The receiving module 21 receives APN restriction information. The storing module 22 stores the APN restriction information. The sending module 23 sends the APN restriction information to a second mobility management element.

In an attach procedure, a procedure that the UE requests establishing a PDN connection, PDP context activation procedure, or other mobility management procedures due to the change of the SGW, after the SGW receives a Create Session Response from the PGW, the storing module 22 stores the APN restriction information carried in the Create Session Response.

The SGW provided in this embodiment may further include a judging module 24 configured to judge whether to send a Modify Bearer Request to the PGW. When the judging module 24 determines that the Modify Bearer Request does not need to be sent to the PGW, the sending module 23 sends the stored APN restriction information to the second mobility management element.

Specifically, the judging module 24 is configured to judge whether the RAT carried in the Modify Bearer Request sent by the second mobility management element is the same as the RAT stored on the judging module 24; if the RATs are the same, the judging module 24 determines that the Modify Bearer Request does not need to be sent to the PGW. Or the judging module 24 judges whether the Modify Bearer Request sent by the second mobility management element includes ULI; if the Modify Bearer Request does not include the ULI, the judging module 24 determines that the Modify Bearer Request does not need to be sent to the PGW. Or the judging module 24 judges whether the Modify Bearer Request sent by the second mobility management element includes instruction information that is used to instruct the SGW to send a Modify Bearer Request to the PGW; if the Modify Bearer Request does not include the instruction information, the judging module 24 determines that the Modify Bearer Request does not need to be sent to the PGW.

The SGW provided in this embodiment may be applied in the methods provided in the sixth embodiment, seventh embodiment or eighth embodiment of the present invention.

In this embodiment, the SGW may pre-store the APN restriction information, and send the APN restriction information to the second mobility management element; the second mobility management element may obtain maximum APN restriction information according to the APN restriction information, so that the PGW determines to or refuses to establish a new PDN connection. In this way, the security of private PDNs is improved.

Figure 11:
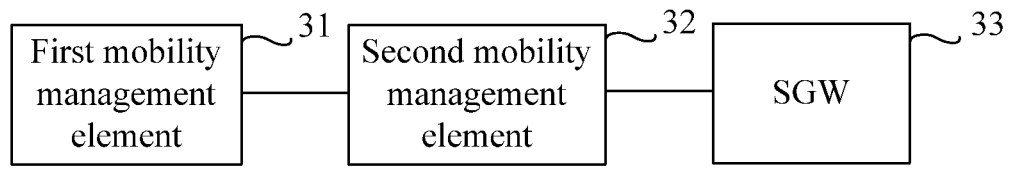
FIG. 11 shows a structure of a system for processing APN restriction information according to an eleventh embodiment of the present invention.

FIG. 11 shows a structure of a system for processing APN restriction information according to an eleventh embodiment of the present invention. As shown in FIG. 11, the system includes a first mobility management element 31 and a second mobility management element 32. The first mobility management element 31 sends first APN restriction information to the second mobility management element 32. The second mobility management element 32 receives the first APN restriction information, and obtains maximum APN restriction information according to the first APN restriction information, so that the PGW determines to or refuses to establish a new PDN connection.

The system provided in this embodiment may further include an SGW 33 configured to send second APN restriction information to the second mobility management element 32. The second mobility management element 32 is configured to obtain the maximum APN restriction information directly according to the second APN restriction information when the first APN restriction information is different from the second APN restriction information, so that the PGW determines to or refuses to establish a new PDN connection.

The system provided in this embodiment may be applied in the methods provided in the first embodiment to the fifth embodiment of the present invention.

In this embodiment, the second mobility management element may receive the first APN restriction information sent by the first mobility management element, and then obtain the maximum APN restriction information according to the first APN restriction information, so that the PGW can determine to or refuse to establish a new PDN connection. In this way, the security of private PDNs is improved.

Figure 12:
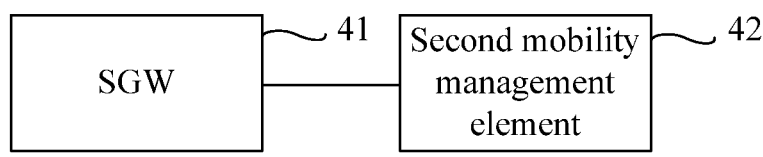
FIG. 12 shows a structure of another system for processing APN restriction information according to a twelfth embodiment of the present invention.

FIG. 12 shows a structure of another system for processing APN restriction information according to a twelfth embodiment of the present invention. As shown in FIG. 12, the system includes an SGW 41 and a second mobility management element 42. The SGW 41 receives and stores APN restriction information, and sends the APN restriction information to the second mobility management element 42. The second mobility management element 42 receives the APN restriction information, and obtains maximum APN restriction information according to the APN restriction information, so that the PGW determines to or refuses to establish a new PDN connection.

The system provided in this embodiment may be applied in the method provided in the sixth embodiment, seventh embodiment or eighth embodiment of the present invention.

In this embodiment, the second mobility management element may receive the APN restriction information stored on the SGW, and then obtain the maximum APN restriction information according to the APN restriction information, so that the PGW can determine to or refuse to establish a new PDN connection. In this way, the security of private PDNs is improved.

Those skilled in the art may understand that all or part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be a read only memory (ROM), a random access memory (RAM), a magnetic disk, or a compact disk-read only memory (CD-ROM).

It should be noted that the above embodiments are merely provided for elaborating on the technical solutions of the present invention, but not intended to limit the present invention. Although the present invention has been described in detail with reference to the foregoing embodiments, it is apparent that those skilled in the art may make modifications to the technical solution described in the above embodiments, or may make equivalent replacements to some of the technical features without departing from the spirit and scope of the embodiments of the invention.

What is claimed is:

1. A 3rd generation partnership project (3GPP) system, comprising:
   a first mobility management element;
   a packet data network gateway (PGW) storing an access point name (APN) restriction; and
   a second mobility management element that receives a plurality of APN restrictions for a user equipment (UE) from the first mobility management element without receiving any APN restriction from the PGW in a mobility procedure, and that, in response to receiving a modify bearer response message from a serving gateway, determines a maximum APN restriction using the plurality of APN restrictions received from the first mobility management element.

2. The system according to claim 1, wherein the plurality of APN restrictions are carried in one message.

3. The system according to claim 2, wherein the message is a context response message or a forward relocation request message.

4. The system according to claim 1, wherein the plurality of APN restrictions corresponds to a plurality of PDN connections of the UE.

5. The system according to claim 1, wherein the first mobility management element is a first mobility management entity (MME) or a first serving general packet radio service support node (SGSN).

6. The system according to claim 1, wherein the second mobility management element is a second MME or a second SGSN.

7. A method for processing access point name (APN) restriction information in a 3rd generation partnership project (3GPP) system, comprising:
   receiving, by a second mobility management element, a plurality of APN restrictions for a user equipment (UE) from a first mobility management element without receiving any APN restriction from a packet data network gateway (PGW) of the 3GPP system in a mobility procedure, wherein the PGW stores an APN restriction; and
   in response to receiving a modify bearer response message from a serving gateway, determining a maximum APN restriction using the plurality of APN restrictions received from the first mobility management element.

8. The method according to claim 7, wherein the plurality of APN restrictions are carried in one message.

9. The method according to claim 8, wherein the message is a context response message or a forward relocation request message.

10. The method according to claim 7, wherein the plurality of APN restrictions corresponds to a plurality of PDN connections of the UE.

11. The method according to claim 7, further comprising:
    sending the selected maximum APN restriction from the second mobility management element to a packet data gateway (PGW).

12. The method according to claim 7, wherein the first mobility management element is a first mobility management entity (MME) or a first serving general packet radio service support node (SGSN).

13. The method according to claim 7, wherein the second mobility management element is a second MME or a second SGSN.

14. The method according to claim 7, wherein the serving gateway is a separate entity from the first mobility management element, the second mobility management element, and the packet data network gateway.

15. A second mobility management element, configured a in a 3rd generation partnership project (3GPP) system, the second mobility management element comprising:
    a processor;
    a non-transitory computer-readable storage medium storing a program to be executed by the processor, the program including instructions for:
      receiving a plurality of access point name (APN) restrictions for a user equipment (UE) from a first mobility management element without receiving any APN restriction from a packet data network gateway (PGW) of the 3GPP system in a mobility procedure, wherein the PGW stores an APN restriction; and
      in response to receiving a modify bearer response message from a serving gateway, determining a maximum APN restriction using the plurality of APN restrictions received from the first mobility management element.

16. The second mobility management element according to claim 15, wherein the plurality of APN restrictions are carried in one message.

17. The second mobility management element according to claim 16, wherein the message is a context response message or a forward relocation request message.

18. The second mobility management element according to claim 15, wherein the plurality of APN restrictions corresponds to a plurality of PDN connections of the UE.

19. The second mobility management element according to claim 15, wherein the program further includes instructions for:

sending the selected maximum APN restriction from the second mobility management element to the packet data network gateway (PGW).

20. The second mobility management element according to claim 15, wherein the first mobility management element is a first mobility management entity (MME) or a first serving general packet radio service support node (SGSN).

21. The second mobility management element according to claim 15, wherein the second mobility management element is a second MME or a second SGSN.

22. The second mobility management element according to claim 15, wherein the serving gateway is a separate entity from the first mobility management element, the second mobility management element, and the packet data network gateway.

* * * * *